(12) United States Patent
Dannewitz et al.

(10) Patent No.: US 12,138,903 B2
(45) Date of Patent: Nov. 12, 2024

(54) SURFACE IMPRESSION RESISTANT FILM CONSTRUCTIONS AND METHODS

(71) Applicant: 3M INNOVATIVE PROPERTIES COMPANY, St. Paul, MN (US)

(72) Inventors: Viktor Dannewitz, Langenfeld (DE); Ralf Burmeister, Dormagen-Delrath (DE); Thomas Meyer, Wuppertal (DE); Hubert Werner, Erkrath (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/967,915

(22) PCT Filed: Feb. 5, 2019

(86) PCT No.: PCT/IB2019/050911
§ 371 (c)(1),
(2) Date: Aug. 6, 2020

(87) PCT Pub. No.: WO2019/155358
PCT Pub. Date: Aug. 15, 2019

(65) Prior Publication Data
US 2021/0031490 A1 Feb. 4, 2021

Related U.S. Application Data

(60) Provisional application No. 62/626,941, filed on Feb. 6, 2018.

(51) Int. Cl.
*B32B 7/03* (2019.01)
*B32B 7/06* (2019.01)
(Continued)

(52) U.S. Cl.
CPC .............. *B32B 7/03* (2019.01); *B32B 7/06* (2013.01); *B32B 7/12* (2013.01); *B32B 27/08* (2013.01);
(Continued)

(58) Field of Classification Search
CPC .. B32B 7/022; B32B 7/03; B32B 7/06; B32B 7/12; B32B 27/08; B32B 27/283;
(Continued)

(56) References Cited

U.S. PATENT DOCUMENTS

| 4,219,596 A | 8/1980 | Takemoto |
| 5,750,254 A | 5/1998 | Starkey |

(Continued)

FOREIGN PATENT DOCUMENTS

| CN | 202148278 | 2/2012 |
| CN | 106437071 | 2/2017 |

(Continued)

OTHER PUBLICATIONS

Machine Translation of CN 206383615 via EPO (Year: 2017).*
(Continued)

*Primary Examiner* — Laura C Powers
*Assistant Examiner* — Rebecca L Grusby
(74) *Attorney, Agent, or Firm* — Jeffrey M. Olofson

(57) ABSTRACT

A web of film material wound about a central longitudinal axis to provide a roll, the film material including a conformable base film comprising a first surface and an opposite second surface. The web of film material further includes an adhesive layer including a first surface bonded to the second surface of the base film and an opposite second surface, a release liner releasably attached to the second surface of the adhesive layer, and a protective film layer releasably attached to the first surface of the conformable base film.

12 Claims, 1 Drawing Sheet

(51) Int. Cl.
B32B 7/12 (2006.01)
B32B 27/08 (2006.01)
B32B 27/28 (2006.01)
B32B 27/30 (2006.01)
B32B 27/32 (2006.01)

(52) U.S. Cl.
CPC .......... B32B 27/285 (2013.01); B32B 27/304 (2013.01); B32B 27/32 (2013.01); *B32B 2307/402* (2013.01); *B32B 2307/412* (2013.01); *B32B 2307/414* (2013.01); *B32B 2307/538* (2013.01)

(58) Field of Classification Search
CPC ... B32B 27/285; B32B 27/304; B32B 27/308; B32B 27/32; B32B 27/36; B32B 37/10; B32B 2037/109; B32B 2250/04; B32B 2250/05; B32B 2250/24; B32B 2307/20; B32B 2307/402; B32B 2307/406; B32B 2307/412; B32B 2307/414; B32B 2307/50; B32B 2307/538; B32B 2307/54; B32B 2307/732; B32B 2307/746; B32B 2405/00; B32B 2605/00; B32B 2605/08; B32B 2307/0092; C09J 7/201; C09J 7/24; C09J 7/29; C09J 2423/006; C09J 2427/006
USPC ................................................. 428/40.1, 41.8
See application file for complete search history.

(56) References Cited

U.S. PATENT DOCUMENTS

| | | | |
|---|---|---|---|
| 5,919,537 A * | 7/1999 | Niazy | B32B 27/36 428/40.1 |
| 6,042,678 A | 3/2000 | Johnson | |
| 6,048,026 A | 4/2000 | Barnett | |
| 6,062,629 A * | 5/2000 | Gentile | B60J 11/00 296/136.08 |
| 6,183,861 B1 | 2/2001 | Carroll | |
| 6,821,592 B2 | 11/2004 | Rodick | |
| 9,259,898 B2 | 2/2016 | Hirai | |
| 2003/0127179 A1* | 7/2003 | Pasti | B29C 43/28 156/220 |
| 2004/0018790 A1 | 1/2004 | Kumar | |
| 2008/0190547 A1* | 8/2008 | White | B60J 1/2094 156/108 |
| 2015/0140290 A1* | 5/2015 | Johnson | B29C 43/28 428/195.1 |
| 2015/0202847 A1* | 7/2015 | Johnson | B32B 7/12 156/701 |
| 2016/0002418 A1* | 1/2016 | Steelman | C09J 7/22 156/60 |
| 2016/0129680 A1* | 5/2016 | Ikeda | B41M 7/0081 156/275.5 |
| 2016/0193814 A1* | 7/2016 | Koike | B32B 7/00 428/411.1 |
| 2017/0009105 A1 | 1/2017 | Baetzold | |
| 2017/0198168 A1 | 7/2017 | Baetzold | |
| 2018/0163093 A1 | 6/2018 | McGuire, Jr. | |
| 2020/0062999 A1* | 2/2020 | Kaneko | B32B 1/08 |
| 2021/0016598 A1* | 1/2021 | Rubin | B32B 7/06 |

FOREIGN PATENT DOCUMENTS

| | | | |
|---|---|---|---|
| CN | 106437072 | | 2/2017 |
| CN | 106726585 | | 5/2017 |
| CN | 206383615 U | * | 8/2017 |
| EP | 0569921 | | 11/1993 |
| FR | 2959747 | | 11/2011 |
| GB | 1523718 A | * | 9/1978 |
| JP | 11277708 A | * | 10/1999 |
| JP | 2010-189579 | | 9/2010 |
| WO | WO 1996-005262 | | 2/1996 |
| WO | WO 1998-054681 | | 12/1998 |
| WO | WO 2000-024576 | | 5/2000 |
| WO | WO 2001-083209 | | 11/2001 |
| WO | WO 2002-085644 | | 10/2002 |
| WO | WO 2006-044375 | | 4/2006 |
| WO | WO 2010-129299 | | 11/2010 |
| WO | WO 2012-141994 | | 10/2012 |
| WO | 2013-181315 | | 12/2013 |
| WO | WO 2015-187770 | | 12/2015 |

OTHER PUBLICATIONS

Machine Translation of JP 11277708 via EPO (Year: 1999).*
"What Material Is Used for Vehicle Wraps?", https://www.thesigncenter.biz/blog/bid/105728/What-Material-Is-Used-for-Vehicle-Wraps (Year: 2014).*
"Conformability of calendered vinyl film", https://teckwrap.com/blogs/features/conformability-of-calendered-vinyl-film (Year: 2017).*
A video from Teckwrap uploaded to Instagram on May 13, 2018 [aware of as early as May 17, 2018], URL <https://www.instagram.com/p/Biv0oSPFEV8/?hl=en&taken-by=teckwrap>.
A video from Teckwrap uploaded to Instagram on May 14, 2018 [aware of as early as May 17, 2018], URL <https://www.instagram.com/p/BitQSGQIYTb/?hl=en&taken-by=teckwrap>.
Post-Install Care-TeckWrap [aware of as early as May 17, 2018], URL <https://teckwrap.com/pages/post-install-care> 2 pages.
Pre-Install Tips, TeckWrap, [aware of as early as May 17, 2018], URL <https://teckwrap.com/pages/preinstall-tips> 1 page.
Product Bulletin, TeckWrap TM Film 180 & 190 Series, Apr. 2017, 5 pages.
Storage Rules, TeckWrap, [retrieved from the internet on May 21, 2018], URL <https://teckwrap.com/pages/storage-rules> 1 page.
TeckWrap Standard Install Guide, 2018, [retrieved from the internet on May 21, 2018], URL <https://teckwrap.com/pages/teckwrap-standard-install-guide> 3 pages.
International Search Report for PCT International Application No. PCT/IB2019/050911, mailed on May 29, 2019, 3 pages.

* cited by examiner

SURFACE IMPRESSION RESISTANT FILM CONSTRUCTIONS AND METHODS

CROSS REFERENCE TO RELATED APPLICATIONS

This application is a national stage filing under 35 U.S.C. 371 of PCT/IB2019/050911, filed Feb. 5, 2019, which claims the benefit of Provisional Application No. 62/626,941, filed Feb. 6, 2018, the disclosure of which is incorporated by reference in their entirety herein.

TECHNICAL FIELD

The present invention relates to film constructions that are resistant to surface impressions, and particularly relates to multilayer films that are manufactured and stored in a roll form yet are resistant to surface impressions.

BACKGROUND

One typical process used for manufacturing films includes coating a carrier web with a top film layer and then adding optional additional layers. The films are typically stripped from the carrier web prior to lamination to an adhesive-coated liner. The stripping process can occur either offline or inline, wherein some films are stripped inline to minimize the formation of surface impressions that can be caused by the winding tensions on the film when in roll form.

Regardless of whether the film materials are stripped from the carrier web inline or offline, the film surfaces are no longer protected from certain types of damage after being stripped. This can create issues for films that are particularly soft and susceptible to the formation of surface impressions (e.g., folds, dimples, troughs, or other surface imperfections) during the winding process and/or during storage due to winding tension and the static weight of the material on itself when sitting in roll form. In addition, the unprotected films can be prone to scratches when being applied to a surface, such as when a glossy film is applied to a surface with a squeegee that contacts the top surface, for example.

Although a number of processing and material changes have been made to minimize undesirable surface impressions on film surfaces, post-processing is often required to smooth out such imperfections, such as can be provided with heat treatment during the unrolling process and/or during conversion of the material from the roll. This post-processing can be time-consuming and/or costly. There is therefore a desire to provide a surface-impression resistant film construction that minimizes or eliminates surface impressions on films, such as glossy films. Such a construction can be particularly beneficial in situations where large rolls of material are stored for long periods of time.

SUMMARY

The manufacturing methods and film constructions provided herein enable production of films while minimizing or eliminating the formation of undesirable surface impressions, such as films commercially available from the 3M Company of St. Paul, Minnesota under the trade designations "Scotchcal" and "Scotchlite." The methods and constructions can also be useful for preventing scratches during the process of applying the film to another surface.

In accordance with an embodiment of the film material described herein, a web of film material is wound about a central longitudinal axis to provide a roll, wherein the film material includes a conformable base film comprising a first surface and an opposite second surface, an adhesive layer comprising a first surface bonded to the second surface of the base film and an opposite second surface, a release liner releasably attached to the second surface of the adhesive layer, and a protective film layer releasably attached to the first surface of the conformable base film. In use, a portion of the length of film material can be unwindable from the roll and convertible into discrete sheets of film material, wherein the protective film layer is removable from the discrete sheets of film material.

The protective film layer may be optically clear, transparent, translucent, and/or colored, and can have a total visual transmittance of greater than 90%. The protective film layer may also be conformable and have an elongation that is the same or higher than an elongation of the base film. The protective film layer may be made at least partially of polyethylene, polypropylene, and/or polyvinyl chloride, and may be releasably attached to the first surface of the conformable base film with a bonding force in the range of about 2 to 6 cN/25.4 mm measured at a separation speed of 2286 mm/min. In embodiments, the protective film layer is in direct contact with the first surface of the conformable base film.

The conformable base film may include multiple material layers, and may include least one of a single layer polyvinylchloride film, a double layer polyvinylchloride film, a triple layer polyvinylchloride film, a composite film, a polyester-based film, an acrylic-based film, a polyester film, a polypropylene film, a polyurethane film, and a polyolefin film. The first surface of the conformable base film may have a glossy surface with a surface roughness having an Ra value of less than approximately 1 μm and/or a surface roughness having an Rz value of less than approximately 6 μm, although the surface roughness can have Ra and/or Rz values that are somewhat or significantly higher or lower than these approximate values.

In accordance with an embodiment of the film material described herein, a sheet of film material is provided that may include any of the structures, materials, and/or features described above relative to a web of film material that is wound into a roll. This exemplary embodiment of a sheet of film material includes a conformable base film comprising a first surface and an opposite second surface, an adhesive layer including a first surface bonded to the second surface of the base film and an opposite second surface, a release liner releasably attached to the second surface of the adhesive layer, and a protective film layer releasably attached to the first surface of the conformable base film.

In accordance with the exemplary embodiments provided herein, a method of applying a sheet of film material to a substrate includes the steps of positioning a sheet of film material adjacent to an outer surface of a substrate, wherein the sheet of film material can include any of the embodiments provided herein for a film material, including a protective film layer releasably attached to a first surface of a conformable base film. The method further includes removing the release liner from the second surface of the adhesive layer and applying the adhesive layer to the outer surface of the substrate. The step of removing the protective film layer from the first surface of the film material may occur either before or after application of the adhesive layer to the outer surface of the substrate, which may be accomplished at least partially with the use of application tools.

BRIEF DESCRIPTION OF THE DRAWINGS

The present invention will be further explained with reference to the appended Figures, wherein.

DETAILED DESCRIPTION

Figure 1:
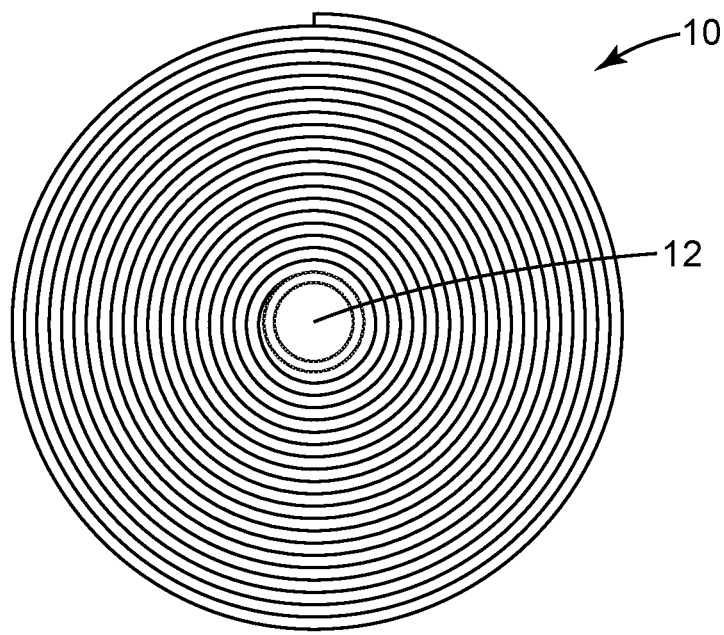
FIG. 1 is a schematic side view of an embodiment of a web of film material wound into a roll.

Referring now to the Figures, and initially to FIG. 1, a roll 10 of film material is shown as it is wound about a longitudinal axis 12. The roll 10 can include a central core that extends through its width around which the film material is wound until either a desired outer diameter of the roll is reached or a desired length of material is wound onto the roll. Embodiments of the construction of the film material used for the roll 10 are discussed herein.

In accordance with embodiments described, features are provided to minimize or prevent surface impressions on the films, such as those that can be caused by the initial winding of film materials onto a roll and/or by the static weight of the web material on itself during storage of the roll for a period of time. In addition, film material embodiments are provided with features that minimize or prevent scratches to the film material surface during application. The basic principle involves covering the film material with a protective layer that does not negatively impact the application characteristics of the final product.

Figure 2:
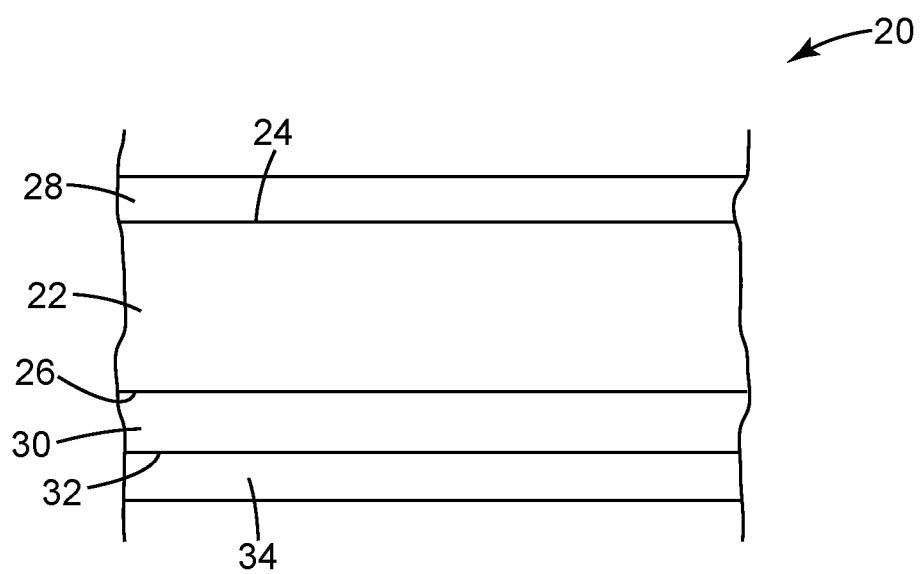
FIG. 2 is a side view of a portion of an embodiment of film material after it has been unwound from a roll.

Referring now to FIG. 2, an exemplary embodiment of a film material 20 is illustrated, which generally includes a base film 22 having a first side 24 and a second side 26, a protective film 28 adjacent to the first side 24 of base film 22, an adhesive layer 30 adjacent to the second side 26 of base film 22, and a release liner 34 adjacent to an outer surface 32 of adhesive layer 30.

Base film 22 is preferably a conformable film material with an elongation level of at least 50% and that includes one or more layers. As used herein, the term "conformable" generally refers to a film that can materially or completely take on the shape of a three-dimensional substrate containing convex features, concave features, and/or other shapes or contours. However, the determination of the conformability of a film is not limited to situations in which is it actually applied to such a substrate, but also that the film has this capability prior to being applied to a substrate. In embodiments, taking on such shape is possible without undesired changes to the structural integrity and/or the aesthetic appearance of the film. In this sense, conformable films are distinguishable from non-conformable films that may be capable of being applied to planar surfaces and/or curved slightly around surfaces that have a sufficiently large radius of curvature (such as a large cylinder), but which are not possible to apply to a more complicated three-dimensional substrate.

Factors that can influence the conformability of a film include the identity of the material used to make the film, the molecular weight of such material, the conditions to which such film is subjected (e.g., temperature, radiation exposure, and humidity), and the presence of additives in the film material (e.g., plasticizer content, reinforcing fibers, pigments, stabilizers (e.g., UV stabilizers), and hardness enhancing particles).

The base film 22 may include a wide variety of materials, such as a single layer polyvinylchloride film that is approximately 50 µm thick with an elongation level of at least 50%, but can even be thinner than 15 µm or thicker than 150 µm. Other exemplary materials that can be used as base film 22 include: a double layer polyvinylchloride film that is approximately 75-95 µm thick with an elongation level of at least 50%; a triple layer polyvinylchloride film that is approximately 130 µm thick with an elongation level of at least 50%; a composite film that includes one or two PVC layers and one or two polyester based layers, with a thickness between approximately 50 and 150 µm; a polyester-based film consisting of an iso-cyanate modified polyester crosslinked with a melamine resin that is approximately 30 to 95 µm thick with an elongation of greater than 50%; and an acrylic-based film consisting of modified acrylic resins having an elongation level of at least 50%; other polyester-based films; polypropylene films, polyurethane films; polyolefin films; and combinations of these and other films that are thinner or thicker than described above and/or that have larger or smaller elongations than described above. With these exemplary materials for the base film 22, the elongation was determined according to DIN EN ISO 527

The base film 22 is generally provided with a relatively smooth surface to which the protective film 28 can be applied. In exemplary embodiments, the base film has a surface roughness of Ra less than approximately 1 µm or a surface roughness of Rz less than approximately 6 µm, wherein the surface roughness was determined according to DIN EN ISO 4287

Adhesive layer 30 and release liner 34 may include, for example, an acrylic adhesive and a siliconized liner, respectively. In an exemplary embodiment, the adhesive layer 30 may include a number of materials or combinations of materials, including pressure sensitive adhesives, films having a network of microstructure air channels in the adhesive that allow air to escape laterally beneath the film (e.g., films available under the trade designation "Comply", commercially available from the 3M Company of St. Paul, Minnesota), and/or material commercially available from the 3M Company of St. Paul, Minnesota under the trade designation "Controltac" that minimizes the initial contact area of adhesive and allows an applicator to reposition the film during application. A release liner 34 can be positioned adjacent to the adhesive layer 30, which is generally a protective film or paper layer that covers the adhesive layer until it is desired to expose the adhesive, such as for application of the film material 20 to a surface.

Protective film 28 can be applied on the base film 22 by a lamination process that includes pressing both films between two rolls. The pressure between both rolls depends on the type of rolls and processing speed, wherein the parameters are preferably adjustable to prevent air entrapment between the film layers. Protective film 28 is generally considered to be protecting the outer or "face" side of the base film 22 during manufacturing process. This protective film 28 can remain on the final product even during the final application process carried out by users of the film material 20.

The bond between the base film 22 and protective film 28 is achieved by weak intermolecular forces. The bonding forces can be determined according to ASTM D3330 methods. In one example, the bonding force between the base film 22 and protective film can be in the range of approximately 2 to 6 cN/25.4 mm measured at a separation speed of 2286 mm/min, although higher or lower bonding forces are contemplated.

The protective film 28 is provided to protect the "face" surface of the base film 22 and thus will also protect the stripped film from "blocking", thereby allowing the film material 20 to be stored for a substantially longer time without adversely impacting the product. Depending on customers' needs the protective film 28 may or not may remain on the final product during application to a surface.

If the protective film 28 remains on the final product during application to a surface, it can prevent formation of scratches and even improve the application characteristics. If the protective film 28 is not desired for the final application, it can be stripped during a converting process. The protective film 28 will generally be easy to remove from the base film 22 without requiring additional cleaning or processing of the top surface of the base film 22.

One material that is useable for the protective film 28 is a thin polyethylene film, which may be suitable as protection layer for any of the base layers 22 described herein. The protective film 28 may alternatively include at least one of polyethylene, polypropylene, and polyvinyl chloride. Another exemplary material for the protective film include profiSTRETCH MCP (Article Number: 8160468) (F1) commercially available from Brangs+Heinrich GmbH of Solingen, Germany, such as is provided as in a thickness of approximately 9 µm, approximately 17 µm, or thicker or thinner films. In embodiments of the film material 20, the protective film 28 will generally be at least as flexible as the base film 22 to which it will be applied.

In certain embodiments, the protective film 28 is optically clear, with a total transmittance of greater than 90% in order to be able to inspect the final product during processing, such as can be determined according to ASTM D1746 methods. Clear protective films will also not impact the visual appearance of the final color. However, it is also possible to use tinted films, translucent films, and/or colored films.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes and are not meant to limit the scope of the appended claims.

TABLE 1

| | Materials |
|---|---|
| Abbreviation | Description |
| F1 | Protective film profiSTRETCH MCP 17 µm (Article Number: 8160468) commercially available from Brangs + Heinrich GmbH of Solingen, Germany |
| F2 | Graphic film, commercially available from 3M Company, St. Paul, MN as "CONTROLTAC CT180-114". |
| F3 | Graphic film, commercially available from 3M Company, St. Paul, MN as "CONTROLTAC CT180-12". |
| F4 | Graphic film, commercially available from 3M Company, St. Paul, MN as "CONTROLTAC CT180-13". |
| F5 | Graphic film, commercially available from 3M Company, St. Paul, MN as "CONTROLTAC CT180-15". |
| F6 | Graphic film, commercially available from 3M Company, St. Paul, MN as "CONTROLTAC CT180-17". |
| F7 | Graphic film, commercially available from 3M Company, St. Paul, MN as "CONTROLTAC CT180-25". |
| F8 | Graphic film, commercially available from 3M Company, St. Paul, MN as "CONTROLTAC CT180-27". |
| F9 | Graphic film, commercially available from 3M Company, St. Paul, MN as "CONTROLTAC CT180-37". |
| F10 | Graphic film, commercially available from 3M Company, St. Paul, MN as "CONTROLTAC CT180-46". |
| F11 | Graphic film, commercially available from 3M Company, St. Paul, MN as "CONTROLTAC CT180-47". |
| F12 | Graphic film, commercially available from 3M Company, St. Paul, MN as "CONTROLTAC CT180-53". |
| F13 | Graphic film, commercially available from 3M Company, St. Paul, MN as "CONTROLTAC CT180-56". |
| F14 | Graphic film, commercially available from 3M Company, St. Paul, MN as "CONTROLTAC CT180-63". |
| F15 | Graphic film, commercially available from 3M Company, St. Paul, MN as "Wrap Film 1380-G12". |

Examples 1-13—Elongation Determination

Elongation values were determined according to test method DIN EN ISO 527 for different colored Graphic films (F2-F14) with a Protective film (F1) on the PVC side of the Graphic film. The Graphic films consist of an approximately 50 µm thick colored PVC cast film, an approximately 30 µm acrylic adhesive and a liner covering the adhesive. The liner was removed for testing. The Protective film (F1) was laminated at room temperature manually to the exposed PVC side of the Graphic film by a rubber roller with firm pressure. The Protective film (F1) adhered to all Graphics films, e.g the bond between the Graphic film and Protective film was larger than 2.8 cN/25.4 mm measured according to ASTM D3330 (180° ∠; 2286 mm/min). The Graphic films with the Protective (F1) film were tested for elongation, results are reported in % and shown in Table 2.

TABLE 2

| | Elongation Results | | | | | |
|---|---|---|---|---|---|---|
| Example | Graphic Film + Protective Film F1 | n (Number of trials) | Mean (%) | StDev (%) | 3s | Range |
| E1 | F2 | 18 | 199 | 22.2 | 67 | 199% ± 67% |
| E2 | F3 | 18 | 168 | 20.6 | 62 | 168% ± 62% |
| E3 | F4 | 276 | 164 | 37.0 | 111 | 164% ± 111% |
| E4 | F5 | 89 | 130 | 27.7 | 83 | 130% ± 83% |
| E5 | F6 | 203 | 193 | 32.9 | 99 | 193% ± 99% |
| E6 | F7 | 54 | 135 | 22.3 | 67 | 135% ± 67% |
| E7 | F8 | 35 | 179 | 32.3 | 97 | 179% ± 97% |
| E8 | F9 | 186 | 177 | 26.3 | 79 | 177% ± 79% |
| E9 | F10 | 18 | 225 | 27.3 | 82 | 225% ± 82% |
| E10 | F11 | 54 | 183 | 21.9 | 66 | 183% ± 66% |
| E11 | F12 | 167 | 195 | 34.9 | 105 | 195% ± 105% |
| E12 | F13 | 54 | 215 | 25.5 | 77 | 215% ± 77% |
| E13 | F14 | 68 | 164 | 27.2 | 82 | 164% ± 82% |

Example 14—Bond Between Base PVC Film and Protective Film

The Protective film (F1) was laminated at room temperature manually to the exposed PVC side of the Graphic film (F15) by a rubber roller with firm pressure. The bond of the Protective film (F1) to the Graphics film was determined according to ASTM D3330 method of stripping the Protective film from the Graphic film (F15) at a 180° angle and a separation speed of 2286 mm/min. The results are reported in cN/25.4 mm.

TABLE 3

Bond Results

| Example | N (Number of trials) | Mean [cN/ 25.4 mm] | StDev [cN/ 25.4 mm] | 3 × StDev [cN/ 25.4 mm] | Range [cN/ 25.4 mm] |
|---|---|---|---|---|---|
| E14 | 15 | 3.62 | 0.36 | 1.07 | 3.62/−1.07 |

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

The following are exemplary embodiments according to the present disclosure:

Item 1. A web of film material wound about a central longitudinal axis to provide a roll, the film material comprising:
a conformable base film comprising a first surface and an opposite second surface;
an adhesive layer comprising:
a first surface bonded to the second surface of the base film; and
an opposite second surface;
a release liner releasably attached to the second surface of the adhesive layer; and
a protective film layer releasably attached to the first surface of the conformable base film.

Item 2. The web of film material of item 1, wherein the conformable base film is wound about the central longitudinal axis to provide the roll.

Item 3. The web of film material of item 1, wherein the protective film layer is at least one of optically clear, transparent, translucent, and colored.

Item 4. The web of film material of item 3, wherein the protective film layer comprises a total visual transmittance of greater than 90%.

Item 5. The web of film material of item 1, wherein the protective film layer is conformable and comprises an elongation that is the same or higher than an elongation of the base film.

Item 6 The web of film material of item 1, wherein the protective film layer comprises at least one of polyethylene, polypropylene, and polyvinyl chloride.

Item 7. The web of film material of item 1, wherein the protective film layer is releasably attached to the first surface of the conformable base film with a bonding force in the range of about 2 to 6 cN/25.4 mm measured at a separation speed of 2286 mm/min.

Item 8. The web of film material of item 1, wherein the conformable base film comprises multiple material layers.

Item 9. The web of film material of item 1, wherein the conformable base film comprises at least one of a single layer polyvinylchloride film, a double layer polyvinylchloride film, a triple layer polyvinylchloride film, a composite film, a polyester-based film, an acrylic-based film, a polyester film, a polypropylene film, a polyurethane film, and a polyolefin film.

Item 10. The web of film material of item 1, wherein the first surface of the conformable base film comprises a glossy surface.

Item 11. The web of film material of item 1, wherein the first surface of the conformable base film comprises a surface roughness having an Ra value of less than approximately 1 μm.

Item 12. The web of film material of item 1, wherein the first surface of the conformable base film comprises a surface roughness having an Rz value of less than approximately 6 μm.

Item 13. The web of film material of item 1, wherein the protective film layer is removable from the first surface of the conformable base film.

Item 14. The web of film material of item 1, comprising a length of film material, wherein a portion of the length of film material is unwindable from the roll and convertible into discrete sheets of film material.

Item 15. The web of film material of item 7, wherein the protective film layer is removable from the discrete sheets of film material.

Item 16. The web of film material of item 1, wherein the protective film layer is in direct contact with the first surface of the conformable base film.

Item 17. The web of film material of item 1, wherein the protective film layer is electrostatically attracted to the first surface of the conformable base film.

Item 18. A sheet of film material comprising:
a conformable base film comprising a first surface and an opposite second surface;
an adhesive layer comprising:
a first surface bonded to the second surface of the base film; and
an opposite second surface;
a release liner releasably attached to the second surface of the adhesive layer; and
a protective film layer releasably attached to the first surface of the conformable base film.

Item 19. The sheet of film material of item 18, wherein the protective film layer is at least one of optically clear, transparent, translucent, and colored.

Item 20. The sheet of film material of item 19, wherein the protective film layer comprises a total visual transmittance of greater than 90%.

Item 21. The sheet of film material of item 18, wherein the conformable base film comprises multiple material layers.

Item 22. The sheet of film material of item 18, wherein the protective film layer is conformable and comprises an elongation that is the same or higher than an elongation of the base film.

Item 23 The sheet of film material of item 18, wherein the protective film layer comprises at least one of polyethylene, polypropylene, and polyvinyl chloride.

Item 24. The sheet of film material of item 18, wherein the protective film layer is releasably attached to the first surface of the conformable base film with a bonding force in the range of about 2 to 6 cN/25.4 mm measured at a separation speed of 2286 mm/min.

Item 25. The sheet of film material of item 18, wherein the conformable base film comprises at least one of a single layer polyvinylchloride film, a double layer polyvinylchloride film, a triple layer polyvinylchloride film, a composite film, a polyester-based film, an acrylic-based film, a polyester film, a polypropylene film, a polyurethane film, and a polyolefin film.

Item 26. The sheet of film material of item 18, wherein the first surface of the conformable base film comprises a glossy surface.

Item 27. The sheet of film material of item 18, wherein the first surface of the conformable base film comprises a surface roughness having an Ra value of less than approximately 1 μm.

Item 28. The sheet of film material of item 18, wherein the first surface of the conformable base film comprises a surface roughness having an Rz value of less than approximately 6 μm.

Item 29. The sheet of film material of item 18, wherein the protective film layer is removable from the first surface of the conformable base film.

Item 30. The sheet of film material of item 18, wherein the protective film layer is in direct contact with the first surface of the conformable base film.

Item 31. The sheet of film material of item 18, wherein the protective film layer is electrostatically attracted to the first surface of the conformable base film.

Item 32. A method of applying a sheet of film material to a substrate, comprising the steps of:
positioning a sheet of film material adjacent to an outer surface of a substrate, wherein the sheet of film material comprises:
a conformable base film comprising a first surface and an opposite second surface;
an adhesive layer comprising:
a first surface bonded to the second surface of the base film; and
an opposite second surface;
a release liner releasably attached to the second surface of the adhesive layer; and
a protective film layer releasably attached to the first surface of the conformable base film;
removing the release liner from the second surface of the adhesive layer; and
applying the adhesive layer to the outer surface of the substrate.

Item 33. The method of item 32, further comprising a step of removing the protective film layer from the first surface of the film material after applying the adhesive layer to the outer surface of the substrate.

Item 34. The method of item 32, further comprising the step of removing the protective film layer from the first surface of the film material before applying the adhesive layer to the outer surface of the substrate.

Item 35. The method of item 32, wherein the adhesive layer application step comprises applying the adhesive layer using application tools.

Item 36. The method of item 35, wherein the application tools used in the application step include at least one of a squeegee and a roll of cutting surfaces.

The invention claimed is:

1. A web of film material wound about a central longitudinal axis to provide a roll, the film material comprising:
a conformable base film comprising a first surface and an opposite second surface, the conformable base film comprising at least one layer of polyvinyl chloride film;
an adhesive layer comprising:
a first surface bonded to the second surface of the base film; and
an opposite second surface;
a release liner releasably attached to the second surface of the adhesive layer; and
a protective film layer releasably attached to the first surface of the conformable base film without another layer, including any adhesive layer, between the protective film layer and the at least one layer of polyvinyl chloride film such that the protective film layer is in direct contact with the first surface of the conformable base film, and the bonding force between the protective film layer and the first surface of the conformable base film is achieved by weak intermolecular forces, having a bonding force in the range of about 2 to 6 cN/25.4 mm measured at a separation speed of 2286 mm/min, the protective film layer provided in a thickness of approximately 17 micrometers or thinner, and wherein the protective film layer is conformable and has an elongation that is the same or higher than an elongation of the base film.

2. The web of film material of claim 1, wherein the protective film layer is at least one of optically clear, transparent, translucent, and colored.

3. The web of film material of claim 2, wherein the protective film layer has a total visual transmittance of greater than 90%.

4. The web of film material of claim 1, wherein the conformable base film comprises multiple material layers.

5. The web of film material of claim 1, wherein the conformable base film comprises at least one of a single layer polyvinylchloride film, a double layer polyvinylchloride film, a triple layer polyvinylchloride film, a composite film, a polyester-based film, an acrylic-based film, a polyester film, a polypropylene film, a polyurethane film, and a polyolefin film.

6. The web of film material of claim 1, wherein the first surface of the conformable base film is a glossy surface.

7. The web of film material of claim 1, wherein the first surface of the conformable base film has a surface roughness having an Ra value of less than approximately 1 μm.

8. The web of film material of claim 1, wherein the first surface of the conformable base film has a surface roughness having an Rz value of less than approximately 6 μm.

9. A sheet of film material comprising:
a conformable base film comprising a first surface and an opposite second surface, the conformable base film comprising at least one layer of polyvinyl chloride film;
an adhesive layer comprising:
a first surface bonded to the second surface of the base film; and
an opposite second surface;
a release liner releasably attached to the second surface of the adhesive layer; and
a protective film layer releasably attached to the first surface of the conformable base film without another layer, including any adhesive layer, between the protective film layer and the at least one layer of polyvinyl chloride film such that the protective film layer is in direct contact with the first surface of the conformable base film, and the bonding force between the protective film layer and the first surface of the conformable base film is achieved by weak intermolecular forces, having a bonding force in the range of about 2 to 6 cN/25.4 mm measured at a separation speed of 2286 mm/min, the protective film layer provided in a thickness of approximately 17 micrometers or thinner, and wherein the protective film layer is conformable and has an elongation that is the same or higher than an elongation of the base film.

10. A method of applying a sheet of film material to a substrate, comprising the steps of:

positioning a sheet of film material adjacent to an outer surface of a substrate, wherein the sheet of film material comprises:
a conformable base film comprising a first surface and an opposite second surface, the conformable base film comprising at least one layer of polyvinyl chloride film;
an adhesive layer comprising:
  a first surface bonded to the second surface of the base film; and
  an opposite second surface;
a release liner releasably attached to the second surface of the adhesive layer; and
a protective film layer releasably attached to the first surface of the conformable base film without another layer, including any adhesive layer, between the protective film layer and the at least one layer of polyvinyl chloride film such that the protective film layer is in direct contact with the first surface of the conformable base film, and the bonding force between the protective film layer and the first surface of the conformable base film is achieved by weak intermolecular forces, having a bonding force in the range of about 2 to 6 cN/25.4 mm measured at a separation speed of 2286 mm/min, the protective film layer provided in a thickness of approximately 17 micrometers or thinner, and wherein the protective film layer is conformable and has an elongation that is the same or higher than an elongation of the base film;
removing the release liner from the second surface of the adhesive layer; and
applying the adhesive layer to the outer surface of the substrate.

11. The method of claim 10, further comprising a step of removing the protective film layer from the first surface of the film material after applying the adhesive layer to the outer surface of the substrate.

12. The method of claim 10, further comprising the step of removing the protective film layer from the first surface of the film material before applying the adhesive layer to the outer surface of the substrate.

* * * * *